UNITED STATES PATENT OFFICE.

BENNO HOMOLKA, OF FRANKFORT-ON-THE-MAIN, AND AUGUST STOCK, OF HÖCHST-ON-THE-MAIN, GERMANY, ASSIGNORS TO THE FARBWERKE, VORMALS MEISTER, LUCIUS & BRÜNING, OF HÖCHST-ON-THE-MAIN, GERMANY.

PROCESS OF MAKING AMIDOBENZYLIDEN ANILIN COMPOUNDS.

SPECIFICATION forming part of Letters Patent No. 640,563, dated January 2, 1900.

Application filed May 31, 1898. Serial No. 682,159. (Specimens.)

*To all whom it may concern:*

Be it known that we, BENNO HOMOLKA, doctor of philosophy, a citizen of the Empire of Austria-Hungary, residing at Frankfort-on-the-Main, and AUGUST STOCK, a citizen of the Empire of Germany, residing at Höchst-on-the-Main, Germany, have invented certain new and useful Improvements in Processes of Manufacturing Ortho- and Para- Amidobenzyliden-Anilin, their Homologues and Sulfonic Acids, of which the following is a specification.

This invention relates to the production of ortho- and para- amidobenzyliden-anilin, their homologues, and the sulfonic acids of these bases.

Concerning the reduction of ortho- and para-nitrobenzylanilin with ammonium-sulfid two processes are described in chemical literature. Strakosch (Ber. VI, 1063) obtained by a short action of an excess of ammonium sulfid upon para-nitrobenzylanilin under pressure a base melting at 88° centigrade, which he considered to be amidobenzylanilin, but which was, however, according to later researches, (German Letters Patent 56,908,) diamidodiphenylmethane. The second process emanates from C. Paal, (German Letters Patent 52,647, now void,) who states that by the action of alcoholic ammonium-sulfid upon ortho-nitrobenzylanilin the ortho-amidobenzylanilin may be obtained. The description of this process is so imperfect that it is scarcely possible to work successfully according to it. It is said, for instance, "ten kilos of ortho-nitrobenzylanilin, dissolved in forty liters of alcohol, are heated with twenty liters of alcoholic ammonium sulfid," &c. Nothing is mentioned of the contents of $NH_3SH$ in the alcoholic ammonium sulfid; but the exact proportions of the quantities of the reacting substances are of the greatest importance. We have made several experiments according to Paal's statement, but could not confirm his results. In taking up the study of this subject we have found that by the action of sulfur alkalies—for instance, sodium sulfid ($Na_2S$)—the nitrobenzylanilin of the simplest general formula, $NO_2-C_6H_4-CH_2-NH-C_6H_5$, are transformed into the corresponding amidobenzyliden bases of the general formula $NH_2.C_6H_4-CH=N=C_6H_5$. Thus an intermolecular simultaneous oxidation of the group $CH_2-NH$ to $CH=N$ and a reduction of the $NO_2$ group to $NH_2$ takes place. This formation takes place in about the sense of the following equation:

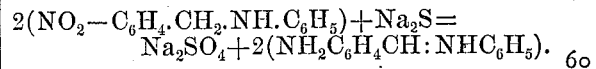

We have further found that in order to accelerate the reaction it is best to add a little free sulfur besides the sodium sulfid. When instead of the said nitrobenzyl bases their sulfonic acids, of the general formula

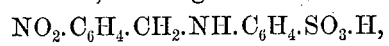

(or their respective salts,) are subjected to the action of sodium sulfid, the amidobenzyliden-anilin-sulfonic acids of the simplest formula, $NH_2-C_6H_4-CH=N-C_6H_4-SO_3H$, are obtained. The amidobenzyliden bases, as well as their sulfonic acids and the amidobenzyliden-anilins and their sulfonic acids, decompose by the action of diluted mineral acids, as is known, into the amidobenzaldehyde on the one hand and the anilin base (or sulfonic acid) on the other hand:

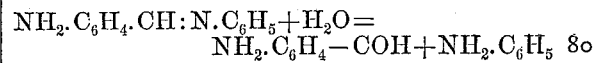

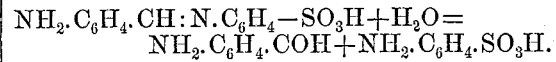

In this manner they offer a convenient starting material for the manufacture of technically valuable amidobenzaldehydes. In reconsidering once more the process of the German Letters Patent 52,647 it may be said that C. Paal has here worked with a great excess of ammonium sulfid. In this case it cannot be obviated that the first-formed amidobenzyliden-anilin is further reduced to amidobenzylanilin, as benzylanilin is obtained by the alkaline reduction of benzyliden-anilin. (Ann. 241,330.)

We proceed, for instance, as follows:

*I. Para-amidobenzyliden-anilin*—One hundred and fourteen parts, by weight, of paranitrobenzylanilin are dissolved in four hundred parts, by weight, of alcohol, to which is added a solution of one hundred and twenty parts, by weight, of sodium sulfid ($Na_2S+9H_2O$) and thirty-two parts, by weight, of sulfur and one hundred parts, by weight, of water. The mixture becomes heated and soon becomes of an intense red-yellow color. The reaction is facilitated by the application of heat so as to keep the liquid on a gentle boil. The reaction is generally completed within two or three hours. The alcohol is distilled off and the remaining oil is repeatedly washed with water to remove the inorganic salts. The para-amidobenzyliden-anilin thus obtained is a red-yellow thick fluid, not distillable oil, of a weak anilin odor, insoluble in water, soluble in alcohol, ether, and benzene with a yellow color. It burns sometimes after standing for a considerable time into a vivid amorphous mass, (evidently a product of polymerisation.) When diluted, mineral acids are poured over the para-amidobenzyliden-analin, it solidifies to a crystalline paste of the well-known red product of polymerisation of para-amidobenzaldehyde. In the same way as the para-amidobenzylidene-anilin its homologues may be obtained from the homologous nitrobenzylanilins, especially the following:

para-amidobenzyliden-ortho-toluidin from para-nitrobenzyl-ortho-toluidin, para-amidobenzyliden-para-toluidin from para-nitrobenzyl-para-toluidin, para-amidobenzyliden-meta-xylidin from para-nitrobenzyl-meta-xylidin.

The para-amidobenzyliden bases thus obtained are quite identical in their physical properties and chemical behavior with the para-amidobenzyliden-anilin.

II. *Para-amidobenzyliden-anilin-sulfonic acids*—Two hundred and thirty parts, by weight, of para-nitrobenzylsulfanilate of sodium are dissolved in one thousand parts, by weight, of water, to which is added a solution of two hundred and fifty parts, by weight, of sodium sulfid ($Na_2S + 9H_2O$) and sixty-five parts, by weight, of sulfur in two hundred parts, by weight, of water and heated from four to five hours on the water-bath. From this solution the separated sulfur is filtered off, whereupon after the filtrate is cooled down the para-amidobenzylidensulfanilate of sodium crystallizes out in yellow laminæ, which are insoluble in alcohol, ether, and benzene, soluble in water with a yellow color. Heated with diluted acids the para-amidobenzylidensulfanilic acid decomposes into sulfanilic acid and the above-mentioned red product of polymerisation of para-amidobenzaldehyde in the same way as the para-amidobenzylidensulfanilic acid is derived from para-nitrobenzylsulfanilic acid. Thus from the two isomers of the latter the isomeric para-amidobenzyliden-anilin-sulfonic acids are obtained and from the homologues of para-nitrobenzylanilin-sulfonic acids the homologous para-amidobenzylidenanilin-sulfonic acids, especially:

from para-nitrobenzyl-ortho-toluidinsulfonic acid the para-amidobenzyliden-ortho-toluidin-sulfonic acid, from para-nitrobenzyl-para-toluidinsulfonic acid the para-amidobenzyliden-para-toluidin-sulfonic acid, from para-nitrobenzyl-xylidinesulfonic acid the para-amidobenzyliden-xylidin-sulfonic acid.

The properties of all coincide closely with those of the above-mentioned para-amidobenzyliden-sulfanilic acid.

III. *Ortho-amidobenzyliden-anilin and its homologues, ortho-amidobenzylidensulfanilic acid, its isomers and homologues.* When in the above examples I and II for the para-nitrobenzylanilin and its homologues or the para-nitrobenzylsulfanilic acid, its isomers and homologues are substituted by the corresponding ortho-nitro compounds, there is obtained on the one hand ortho-amidobenzyliden-anilin and its homologues and on the other hand ortho-amidobenzyliden-anilinsulfonic acids, their isomers and homologues. Thus is obtained from ortho-nitrobenzylanilin the ortho-amidobenzyliden-anilin, from ortho-nitrobenzyl-ortho-toluidin the ortho-amidobenzyliden-ortho-toluidin, from ortho-nitrobenzyl-para-toluidin the ortho-amidobenzyliden-para-toluidin, from ortho-nitrobenzyl-xylidin the ortho-amidobenzyliden-xylidin. Moreover, from the three ortho-nitrobenzylanilinsulfonic acids the three ortho-amidobenzylideneanilin-sulfonic acids, from the ortho-nitrobenzyltoluidin-sulfonic acids the ortho-amidobenzylidentoluidin-sulfonic acids, from the ortho-nitrobenzylxylidinsulfonic acids the ortho-amidobenzylidenxylidin-sulfonic acids. The ortho-amidobenzyliden-anilins thus obtained are orange-yellow, not distillable oils, insoluble in water, soluble in alcohol, benzene, and ether with an orange-yellow color. The said ortho-amidobenzyliden-anilin-sulfonic acids are soluble in form of their alkaline salts in water with a yellow color; the free acids are exceedingly unstable, as they decompose when heated with water into anilin-sulfonic-acid and ortho-amidobenzaldehyde. On being treated with mineral acids the ortho-amidobenzyliden-anilins, as well as their sulfonic acids, decompose while forming products of polymerisation of ortho-amidobenzaldehyde.

Having now described our invention, what we claim is—

The herein-described process for the manufacture of amidobenzyliden-anilin compounds, which consists in subjecting nitrobenzylanilins to the action of alkali sulfids while heated, substantially as set forth.

In testimony that we claim the foregoing as our invention we have signed our names in presence of two subscribing witnesses.

BENNO HOMOLKA.
AUGUST STOCK.

Witnesses:
HEINRICH HAHN,
BERNHARD LEYDECKER.